United States Patent
Loughry et al.

(10) Patent No.: US 11,107,258 B2
(45) Date of Patent: Aug. 31, 2021

(54) PROVIDING A DARK VIEWING MODE WHILE PRESERVING FORMATTING

(71) Applicant: MICROSOFT TECHNOLOGY LICENSING, LLC, Redmond, WA (US)

(72) Inventors: Michael Patrick Loughry, Kirkland, WA (US); Stauffer Alexander Taylor, Seattle, WA (US); Caleb Whitmore, Vancouver (CA); Philip Zhian Loh, Seattle, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 16/151,581

(22) Filed: Oct. 4, 2018

(65) Prior Publication Data

US 2020/0027249 A1    Jan. 23, 2020

Related U.S. Application Data

(60) Provisional application No. 62/701,546, filed on Jul. 20, 2018.

(51) Int. Cl.
*G06T 11/00* (2006.01)
*G06F 3/0484* (2013.01)

(52) U.S. Cl.
CPC ........ *G06T 11/001* (2013.01); *G06F 3/04845* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 5,204,665 A | * | 4/1993 | Bollman | G09G 5/02 345/593 |
| 6,809,741 B1 | * | 10/2004 | Bates | G06F 3/0481 345/597 |

(Continued)

FOREIGN PATENT DOCUMENTS

| | | |
|---|---|---|
| CN | 101706718 A | 5/2010 |
| CN | 103151022 A | 6/2013 |
| EP | 3038100 A1 | 6/2016 |

OTHER PUBLICATIONS

"AquaMail—Email App", Retrieved from: https://play.google.com/store/apps/details?id=org.kman.AguaMail&rdid=org.kman.AquaMail&pli=1, Retrieved Date: May 24, 2018, 5 Pages.

(Continued)

*Primary Examiner* — Aaron M Richer
(74) *Attorney, Agent, or Firm* — NovoTechIP International PLLC

(57) ABSTRACT

A method for improving visibility of contents displayed on a GUI by providing a dark viewing mode that preserves user-generated formatting and/or style contained in the contents is disclosed. The method includes receiving content for displaying on the display, parsing the received content into one or more objects, based on at least a formatting characteristic of the objects, and comparing for each object a first color characteristic of the object with a second color characteristic to determine if a contrast between the first color characteristic and the second color characteristic satisfies a threshold requirement. Upon determining that the threshold requirement is not satisfied, the method includes adjusting the first characteristic, and displaying the objects with the adjusted first characteristic.

20 Claims, 9 Drawing Sheets

(56) References Cited

U.S. PATENT DOCUMENTS

| | | | |
|---|---|---|---|
| 9,542,907 B2 | 1/2017 | Kocienda et al. | |
| 9,671,946 B2 | 6/2017 | Patel et al. | |
| 10,319,116 B1* | 6/2019 | C | G09G 5/02 |
| 2006/0022993 A1* | 2/2006 | Hammond | H04N 1/6027 345/590 |
| 2008/0193011 A1* | 8/2008 | Hayashi | G06T 1/00 382/167 |
| 2009/0058874 A1* | 3/2009 | Takenaka | G09G 5/14 345/589 |
| 2010/0026904 A1* | 2/2010 | Higuchi | H04N 7/0137 348/700 |
| 2012/0127198 A1 | 5/2012 | Gundavarapu | |
| 2014/0368525 A1 | 12/2014 | Faaborg et al. | |
| 2015/0091935 A1 | 4/2015 | Zhang | |
| 2020/0034575 A1* | 1/2020 | Wu | G06F 21/74 |

OTHER PUBLICATIONS

Tanous, Jim, "Go Easy on Your Eyes by enabling the iBooks Auto-Night Theme in iOS", Retrieved from: https://www.tekrevue.com/tip/ibooks-auto-night-theme/, Nov. 11, 2014, 10 Pages.

"Dark theme—Material Design", Retrieved from: https://material.io/design/color/dark-theme.html#usage, Retrieved Date: May 15, 2019, 32 Pages.

"International Search Report and Written Opinion Issued in PCT Application No. PCT/US2019/038067", dated Aug. 29, 2019, 13 Pages.

\* cited by examiner

PROVIDING A DARK VIEWING MODE WHILE PRESERVING FORMATTING

CROSS REFERENCE TO RELATED APPLICATION

This application claims the benefit of priority to U.S. Provisional Application No. 62/701,546, entitled "Visibility Of Content While Preserving Formatting," filed on Jul. 20, 2018, the entirety of which is incorporated by reference herein.

TECHNICAL FIELD

This disclosure relates generally to modifying content to be displayed in a graphical user interface to improve visibility and aesthetics and, more particularly, to a method of aesthetically converting received content containing user-generated formatting and/or styles to a different viewing mode while persevering the user-generated formatting and/or style.

BACKGROUND

With the increasing use of small computing devices, more users utilize their devices at night, sometimes in bed. The use of a device with a bright light background at night can be visually uncomfortable for the user, as well as create discomfort and distraction for anyone else sleeping nearby. To avoid this, dark viewing modes have started being offered by various applications.

However, most of the dark viewing modes offered by these applications do not provide a completely dark experience. Most of these applications only change the background color of one section of a screen, leaving the rest of the display screen with a light background. For example, some applications change the background color of the header and menu sections, without changing the colors of the main portion of the screen. This may help reduce glare and brightness to an extent, but it does not remove them.

The few applications that do provide dark-viewing modes for the entire screen, convert the background color and text color of the contents without regard to preserving original formatting and style of the content, as originally formatted. For example, if a portion of the original text is in a different color or contains highlighting, conversion to a dark mode removes this formatting difference by turning the entire text white and the entire background color dark.

SUMMARY

In one general aspect, the instant application describes a device including one or more processors, and a memory in communication with the one or more processors. In one implementation, the memory includes executable instructions that, when executed by, the one or more processors, cause the device to perform functions of receiving content for displaying on a display screen, parsing the received content into one or more objects, based on at least a formatting characteristic of the one or more objects, comparing for at least one of the one or more objects a first characteristic of the at least one of the one or more objects with a second characteristic to determine if a contrast between the first characteristic and the second characteristic satisfies a threshold requirement, upon determining that the threshold requirement is not satisfied, adjusting the first characteristic, and providing the at least one of the one or more objects with the adjusted first characteristic for being displayed on the display screen.

In another general aspect, the instant application describes an apparatus which includes a processing means and a memory means. In one implementation, the memory means is readable by the processing means and includes instructions stored thereon that cause the processing means to receive content for displaying on a display screen, parse the received content into one or more objects, based on a formatting of the one or more objects, compare for at least one of the one or more objects a first characteristic of the at least one of the one or more objects with a second characteristic to determine if a contrast between the first characteristic and the second characteristic satisfies a threshold requirement, upon determining that the threshold requirement is satisfied, adjust the first characteristic, and provide the at least one of the one or more objects with the adjusted first characteristic for being displayed on the display screen.

In yet another general aspect, the instant application describes a method for improving visibility of content displayed in a graphical user interface while preserving original content formatting. In one implementation, the method includes receiving content for displaying on the graphical user interface, parsing the received content into one or more objects, comparing, for at least one of the one or more objects, a first characteristic of the at least one of the one or more objects with a reference characteristic to determine if a contrast between the first characteristic and the reference characteristic satisfies a first threshold requirement, upon determining that the first threshold requirement is not satisfied, adjusting the first characteristic, comparing, for the at least one of the one or more objects, a second characteristic of the at least one of the one or more objects with the adjusted first characteristic to determine if a contrast between the adjusted first characteristic and the second characteristic satisfies a second threshold requirement, upon determining that the second threshold requirement is not satisfied, adjusting the second characteristic, and providing the at least one of the one or more objects with the adjusted first characteristic and the adjusted second characteristic for being displayed on the graphical user interface.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

This description is related to a method of improving visibility for contents displayed on a GUI while preserving the user-generated formatting and/or style contained in the contents. This may be used, for example, in providing a dark viewing mode for contents displayed on a GUI. Currently, applications that provide dark-viewing mode suffer from the technical problem of converting the background color and text color of the contents without regard to preserving original formatting and style of the content as received. For example, if a portion of the received text is in a different color or contains highlighting, conversion to dark mode removes this formatting difference by turning the entire text white and the entire background dark. This description provides a technical solution for converting the colors while preserving original color formatting. This may be done by breaking up the content into one or more elements, examining the formatting characteristics of each element with respect to one or more reference characteristics to determine if an adjustment is needed to improve visibility and/or preserve the original formatting, and adjusting the formatting characteristics if an adjustment is needed. Furthermore, the technical solution provides the convenience of a toggle button or another element for toggling the display between the original version and a dark version for each different region of the screen. For example, each pane in an email application may be toggled between dark and bright viewing modes separately.

As will be understood by persons of skill in the art upon reading this disclosure, benefits and advantages provided by such implementations can include, but are not limited to, providing improved visibility as desired by users and reducing glare, while persevering the original intent and style of the content as determined by the author of the content.

Figure 1A:
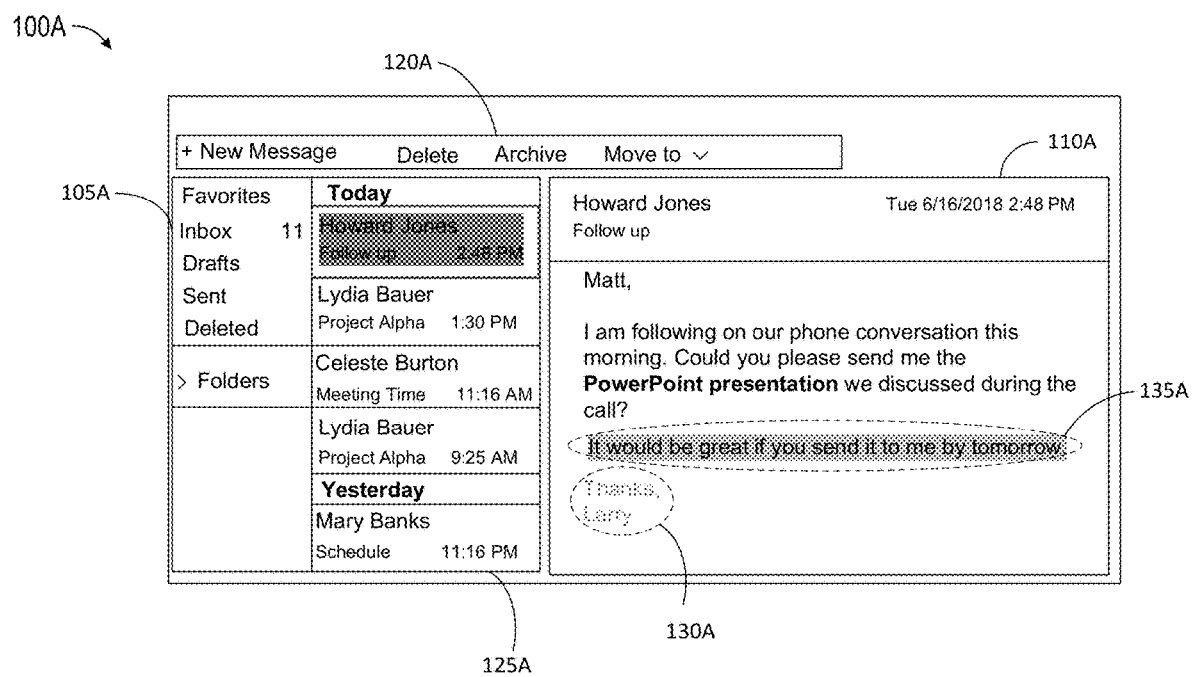
FIG. 1A is an exemplary prior art graphical user interface (GUI) screen displaying contents in an original format in which the contents were received.

Referring now to the drawings, FIG. 1A shows an example prior art graphical user interface (GUI) screen 100A displaying contents in an original format in which the contents were received. GUI screen 100A includes a mailbox menu pane 105A which contains links for accessing different folders in the mailbox and a summary email pane 125A containing a list of emails with certain identifying information such as the senders, titles and date/time of the emails. The email selected from the summary email pane 125A is highlighted (i.e., has a gray background) to indicate that this is the email shown in the email pane 110A of screen 100A. GUI screen 100A also includes a tool bar 120A containing various links for tools to use for composing a new email message or functions to perform with the selected email. The text of the email displayed in the email pane 110A includes a portion 135A with highlighted background and a portion 130A where the text is in a different color (i.e., a color that is different than the default dark color of the remaining text).

Figure 1B:
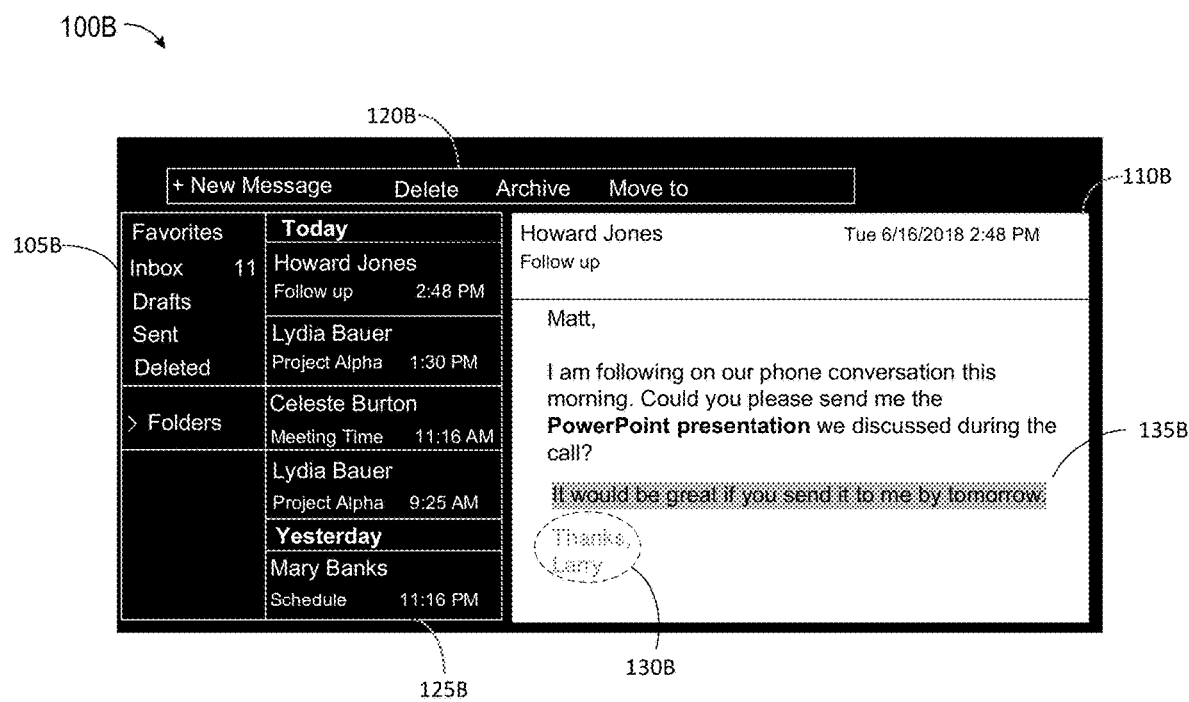
FIGS. 1B-1C are exemplary prior art modified GUI screens displaying the contents of the GUI of FIG. 1 in modified formats.
Figure 1C:
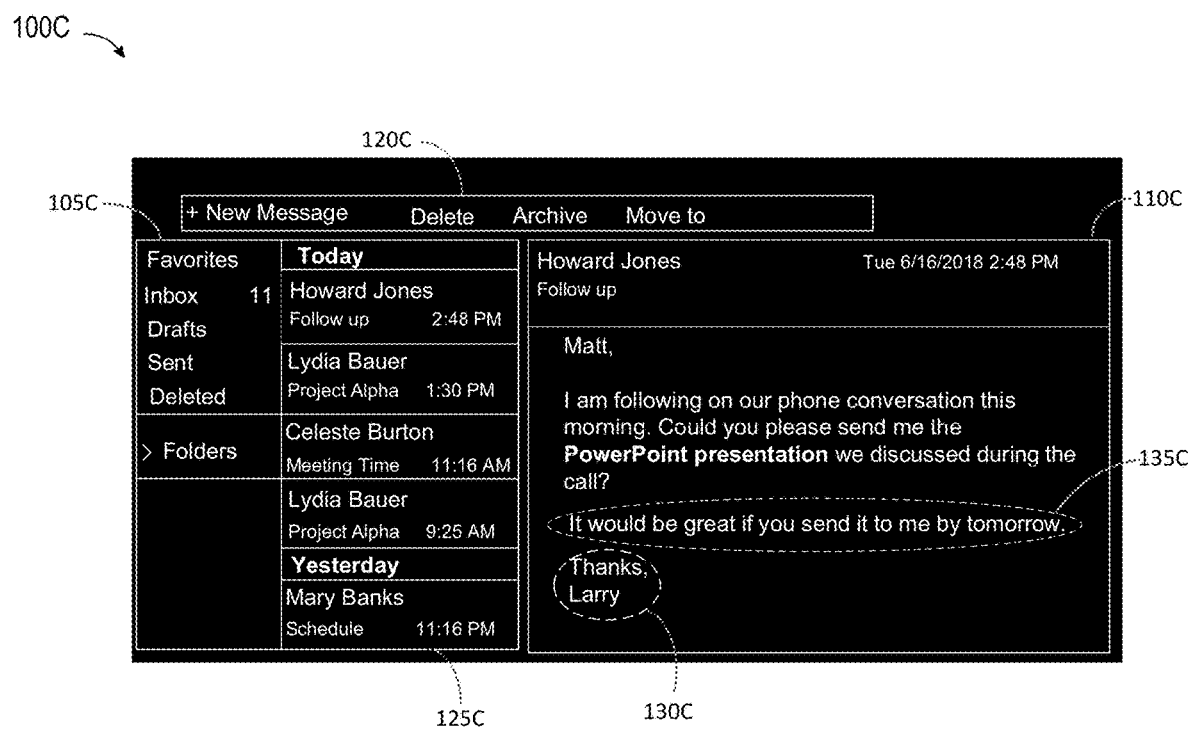

Certain prior art applications provide ways in which a display screen can be turned dark. These applications, however, have limitations. FIGS. 1B-1C show two examples of such conversions from an original display mode to dark viewing mode for the GUI screen 100A of FIG. 1. As can be seen, GUI screen 100B of FIG. 1B converts the background color of the content of some sections of the screen from a light color (e.g., white) to a dark color (e.g., black), while turning the color of the text from those sections from a dark color (e.g., black) to a lighter color (e.g., white). Thus, the mailbox menu pane 105B, the toolbar 120B, and the summary email pane 125B have been converted to a dark display mode. However, the screen 100B leaves a region of the screen which may include user-generated formatting or styles, such as the formatting of the text portions 130B and 135B unchanged. This may be because, in applications such as email, the user drafting the email has many options for changing the formatting and style of the content. Because prior art applications, do not have a method of preserving such formatting while converting the viewing mode, such prior art applications converting the screen 100A leave the email pane 110B, which may contain such formatting, unchanged to produce the screen 100B. This may be undesirable to a user, since a large portion of the screen is still light. Moreover, the large contrast color between the converted region and the unconverted region of the screen may result in discomfort on the viewer's eyes which can defeat the purpose of the conversion.

To prevent this issue, other prior art applications convert the entire GUI screen from a bright viewing mode to dark viewing mode without taking into account any user-generated formatting of the content. This is illustrated in GUI 100C of FIG. 1B.

As can be seen, the entire content of the GUI screen 100A is converted to dark mode in the GUI 100C by converting the background color of the entire content from a light color (e.g., white) to a darker color (e.g., black) while turning the color of the entire text from a dark color (e.g., black) to a lighter color (e.g., white). This causes the entire text and background color of the mailbox menu pane 105C, email pane 110C, toolbar 120C, and summary email pane 125C to change without any regard as the original text and background color. As a result, the text portion 130C which originally had a different text color in FIG. 1A (shown gray) turns to white, thus eliminating any significance the original user may have intended to give to the text portion 130C by selecting a specific color. Moreover, by changing the entire background color, highlighting of text portion 135C is eliminated, again obviating the user's intent. Moreover, the selected email is no longer highlighted to differentiate it from the other emails in the email summary pane 125C.

Figure 2A:
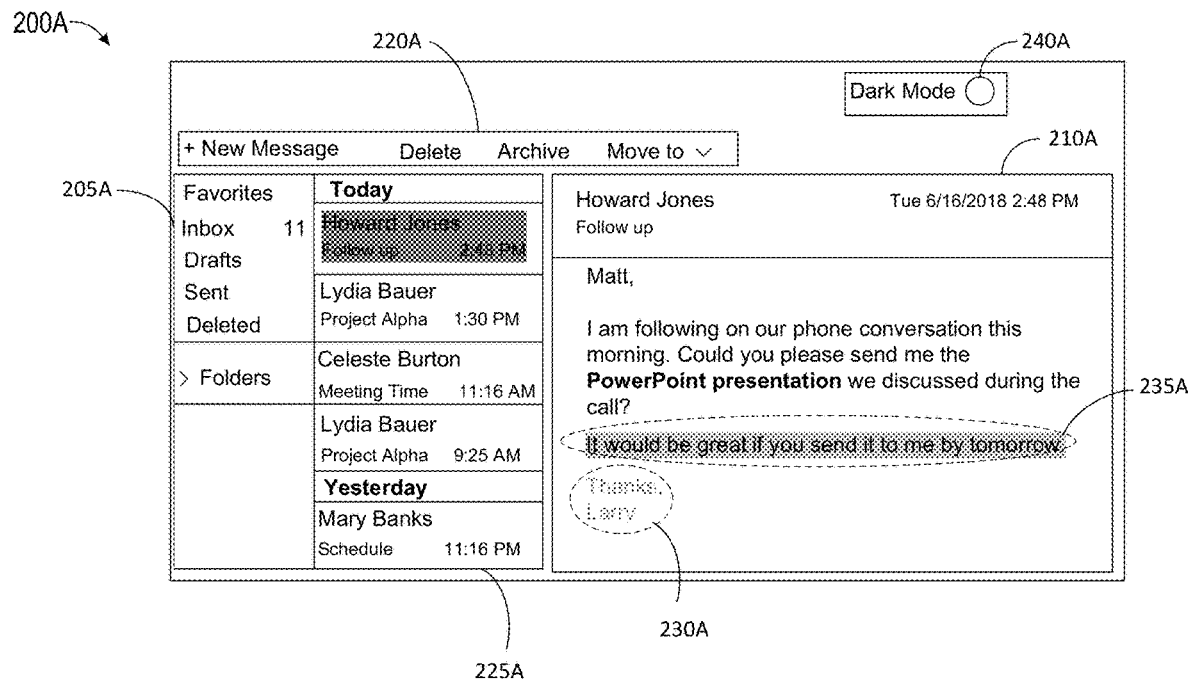
FIG. 2A is an exemplary GUI screen displaying contents in an original format in which the contents were received, having an option for converting the display to a dark mode.
Figure 2B:
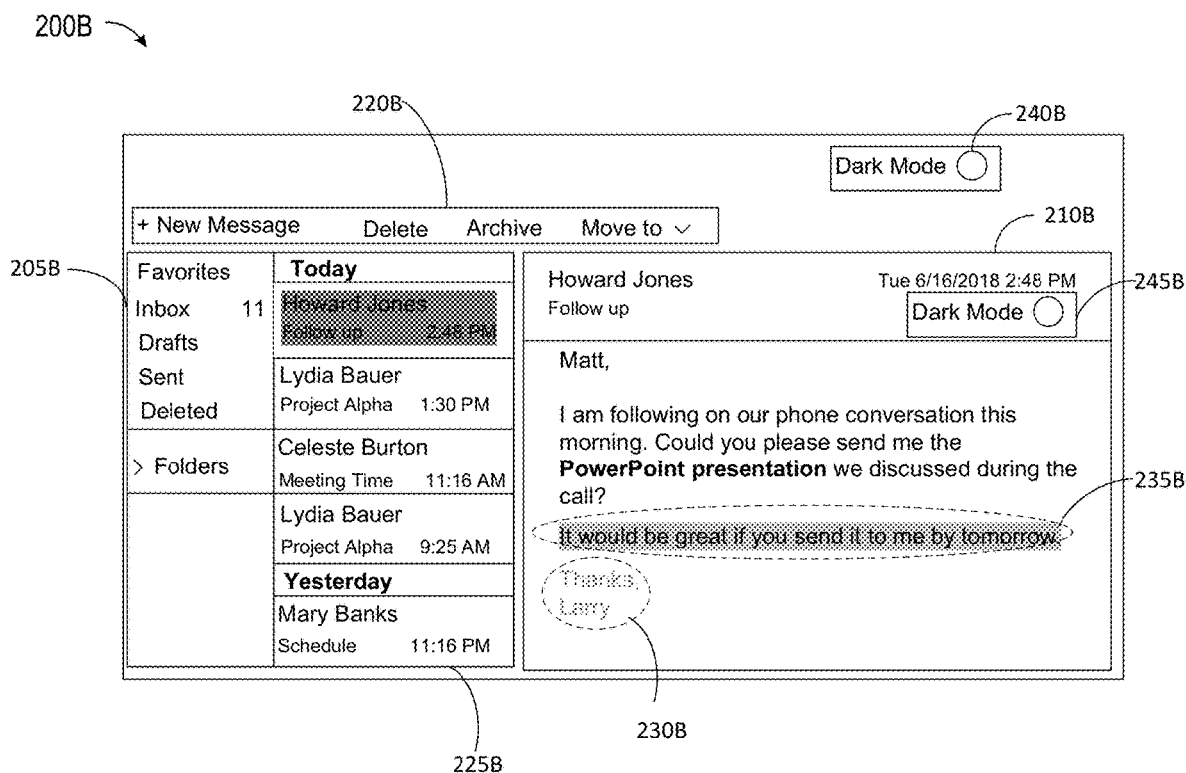
FIGS. 2B-2C are exemplary GUI screens displaying contents in converted GUI screens.
Figure 2C:
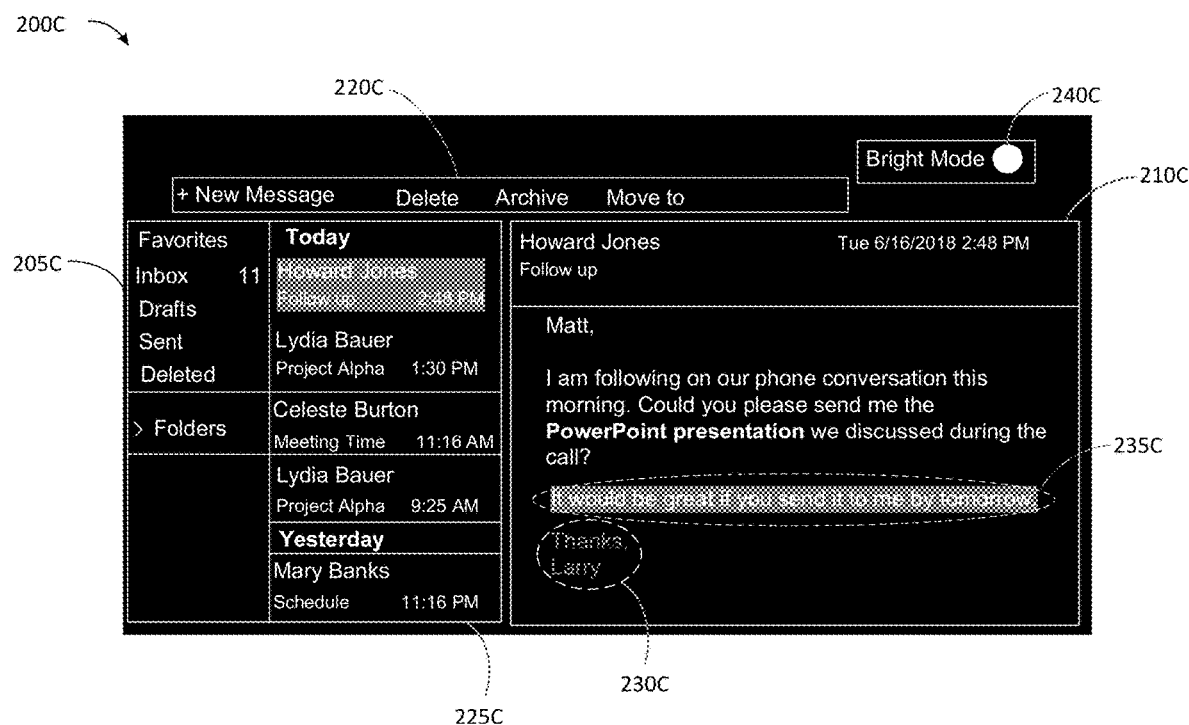

FIG. 2A depicts an exemplary GUI screen 200A displaying contents in an original format in which the contents were received. Similar to the GUI screen 100A, GUI screen 200A includes a mailbox menu pane 205A, email pane 210A, toolbar 220A, and summary email pane 225A. The email pane 210A displays an email containing text portions 230A and 235A which include user generated formatting. The GUI 200A also provides a mechanism for improving visibility of contents displayed on the GUI while preserving the user-generated formatting and/or style contained in the contents. For example, the screen 200A may include a toggle element such as a button simulation 240A for selecting a dark mode, while the screen is in a bright mode. The same button may be used to convert the screen to bright mode, while in dark mode. This is shown in FIG. 2C. Alternatively, a different button may be provided for conversion from dark mode to bright mode. As shown in FIG. 2B, in one implementation, different regions of the screen may include their own respective toggle buttons for turning that section dark or bright. For example, the email pane 210B of GUI screen 200B includes a toggle button 245B for turning just the email pane 210B dark, while the rest of the screen 200B including mailbox menu pane 205B, toolbar 220B, and summary email pane 225B remain bright. Using the toggle button 240B, on the other hand, may turn the entire screen dark. In alternative implementations, each of the other panes in the screen 200B may also include their own respective toggle buttons.

FIG. 2C illustrates an exemplary GUI screen 200C, which depicts how the GUI screen 200A can be converted from a bright mode to a dark mode while preserving the user-generated formatting and/or styles contained in the original contents. As shown, unlike the rest of the content, the text portion 230C of the email pane 210C, which had a different original color, is turned to gray, instead of white (in a full color display that shows various colors this text portion may be turned into different colors, e.g., blue). This is because the improved method of the instant application examines the formatting characteristics of the original content to ensure that the converted content both satisfies visibility thresholds and preserves user-generated formatting and/or style. As a result, the method examines the color of the text to ensure that the original color is visible on the new background. If it is not, the color is changed, accordingly, while taking into account the original color. This means that the method can convert the color of the text to many different colors depending on the original color. The converted color is selected based on the original color and its visibility against the background and is not limited to predefined colors.

Similarly, the text portion 235A which has a highlighted background in the GUI screen 200A is converted such that in the converted screen 200C, text portion 235C has a different background color than the base background color to show the highlighting. However, the original highlighting color may be changed depending on the new color of the text to ensure visibility. In a similar manner, the selected email in the summary email pane 225C has a gray background color, the same way as that of the summary email pane 225A. Moreover, the toggle element or button 240C is converted to show that it can now be used to change the mode to bright mode. The remaining portions of the GUI screen 200C, such as the mailbox menu pane 205C and toolbar 220A which did not include original formatting are simply turned to dark mode.

Figure 3:
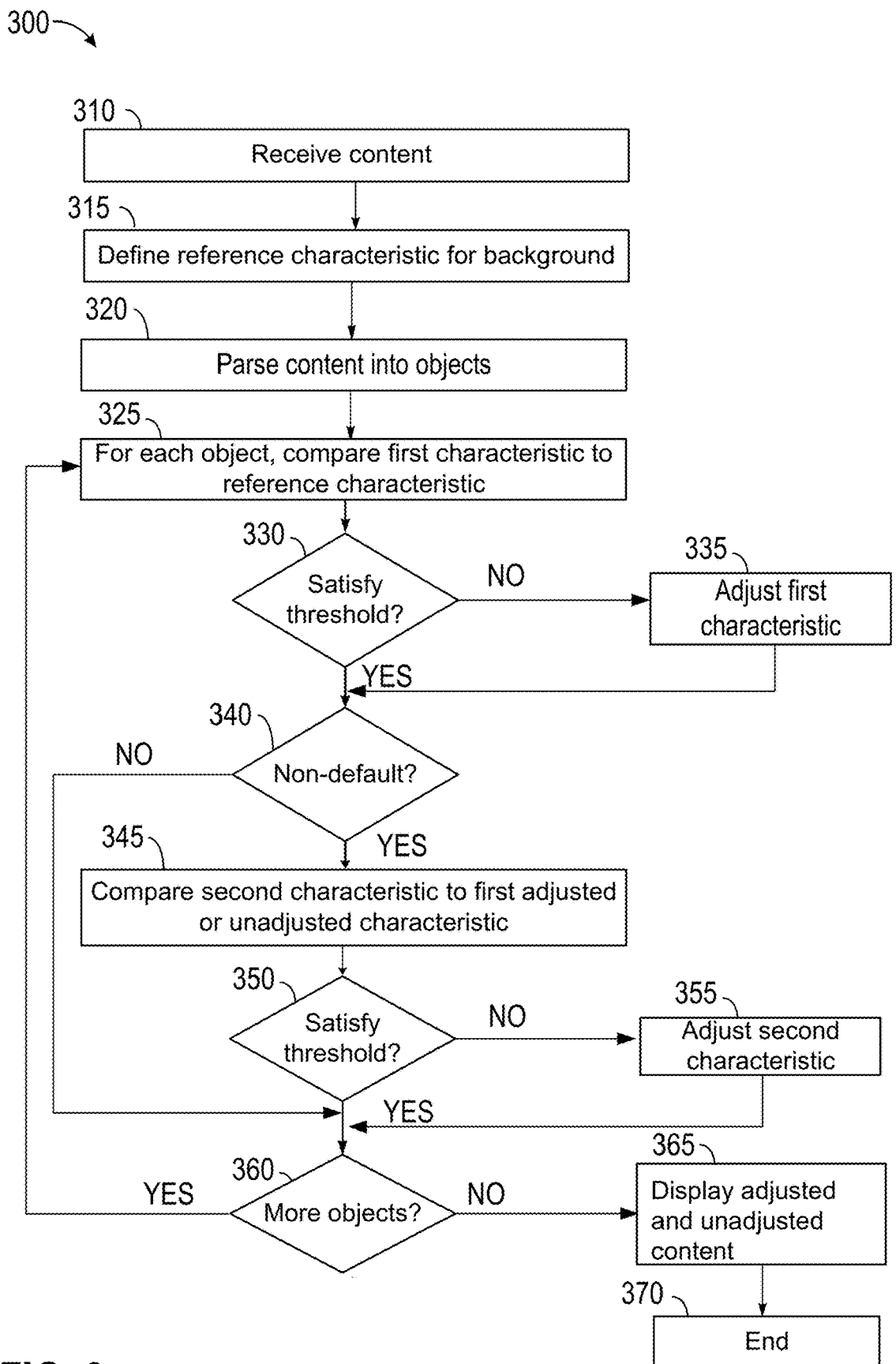
FIG. 3 is a flow diagram for a method of improving visibility for contents displayed on a GUI while persevering user-generated formatting and/or style of the content.

FIG. 3 is a flow diagram depicting an exemplary method 300 for improving visibility of contents displayed on a GUI screen while perserving user-generated formatting and/or style of the content. At 310, the method 300 begins by receiving content for displaying on a GUI. The content may be received through a network or may be generated locally on a user's device. In one implementation, the content is hypertext markup link (HTML) received through a network. For example, the content may include email messages received in an email application or in an internet browser for displaying in the browser. Contents received in this manner may include user-generated styles. For example, email messages, which can originate from a variety of clients and/or providers may contain various types of cascading style sheets (CSS) styles, such as for example, selected text color or selected text highlighting. As a result, providing a dark viewing mode for such content, while preserving the original styles requires specific steps.

After receiving the content, method 300 proceeds to define a reference characteristic for the background based on the user's selected viewing mode, at 315. This reference characteristic may be a background color associated with the user's selected viewing mode. For example, the color black may be associated with the dark viewing mode and the color white may be associated with the bright viewing mode. The background color associated with each viewing mode may be predetermined by the program. Alternatively, the user may have the option of selecting a background color for each viewing mode. The reference characteristic may also include variables for brightness, such as luminosity (luma), when the color space used utilizes such variables.

Once a reference background color has been defined, method 300 parses the contents into one or more objects, at 320. When the received contents are in the html format, this step may be done by examining the received contents to identify one or more html elements. This is because html generally defines the contents by elements, where each element has a different characteristic. For example, the text in an email message may be categorized into two different elements when a portion of the text has a different style, such a different text color, different background color, different font, and the like. If the received content is in a format other than html, which does not break up the contents automatically into one or more objects, the step of parsing the contents may include examining the contents to determine which portion has a style or other characteristic that is different from its neighbor's style or characteristic and parsing the contents into objects accordingly.

Once the objects have been defined, method 300 proceeds to examine the first object to compare a first characteristic of that object to the reference characteristic for background, at 325. The first characteristic may include a color characteristic of the first object, such as a color of the text in the object. Thus, this step may include comparing the color of the text for the selected object to the defined color for the background. This may be done to determine if the color of the text as originally received satisfies a visibility threshold with respect to the newly defined background color. For example, if the color of the text as received is dark blue and the defined background color for the dark mode is black, the method compares the dark blue color with the black color to determine if the dark blue color will be visible on the black color background. The visibility threshold may be predetermined or may be set by a user, and may be different for different color schemes. For example, in the CIE 1976 L, U, V (CIELUV) color space, the threshold may be set at 4.5 for normal text and 3.0 for large text. To determine whether two colors pass this threshold, the luminance of the two colors may be compared. In one implementation, the following formula is used:

$$(L1+0.05)/(L2+0.05) > \text{Threshold} \quad (1)$$

where L1 represents the luminance of the text and L2 represents the luminance of the background color. Thus, in one implementation, the ratio of the luminance of the text color to the luminance of the background color is calculated and compared to a predetermined visibility threshold value to determine if the ratio passes the threshold.

When it is determined, at 330, that the ratio does not satisfy the visibility threshold, method 300 proceeds to adjust the first characteristic (e.g. color of the text) of the object, at 335, as described with respect to the flow chart of method 400. This may be done to ensure that the text will be visible once conversion is completed. If, however, it is determined, at 330, that the visibility threshold is satisfied, method 300 proceeds to step 340 to determine if a second characteristic of the object, such a background color, is a non-default characteristic When this background color is different from a default background color for the received content (e.g., different from a white background color), this may indicate that the object includes highlighting for the text. As a result, step 340 may be performed, to determine if the text includes a non-default background color and thus to ensure that if an object does include a non-default background color, it is treated properly. When it is determined, at 340, that the second characteristic is a default characteristic, method 300 proceeds to step 360 to determine if there are any other objects in the received contents that have not yet been examined and/or adjusted, as discussed further below. When, however, it is determined that the second characteristic is not a default characteristic, method 300 proceeds to 345 to examine the second characteristic of the object with respect to the first characteristic (either adjusted or unadjusted). For example, if a portion of the text as received included light-yellow color highlighting with the original text color being black, and the adjusted text color is now white, method 300 may compare the light-yellow background color with the adjusted white color to determine if the resulting converted content satisfies the visibility threshold. This is because by utilizing the method 300, highlighting included in the received content will also be displayed in the converted content. The visibility threshold may be the same as the visibility threshold examined at step 330 in which case the ratio may be calculated in a similar manner as discussed above.

When it is determined, at 350, that the ratio does not satisfy the visibility threshold, method 300 proceeds to adjust the second characteristic (e.g. background of the text) of the object, at 355, as described with respect to the flow chart of method 400. If, however, it is determined, at 350, that the visibility threshold is satisfied, method 300 proceeds to step 360 to determine if there are any other objects in the received contents that have not yet been examined and/or adjusted. If there are more objects to be examined, method 300 returns to step 325 and repeats the process through step 360 until all objects in the received content have been examined and/or adjusted. Once it is determined, at 360, that no other unexamined object remains, method 300 proceeds to display all the adjusted and/or unadjusted objects in the converted display screen, at 365, before completing the method, at 370.

Figure 4:
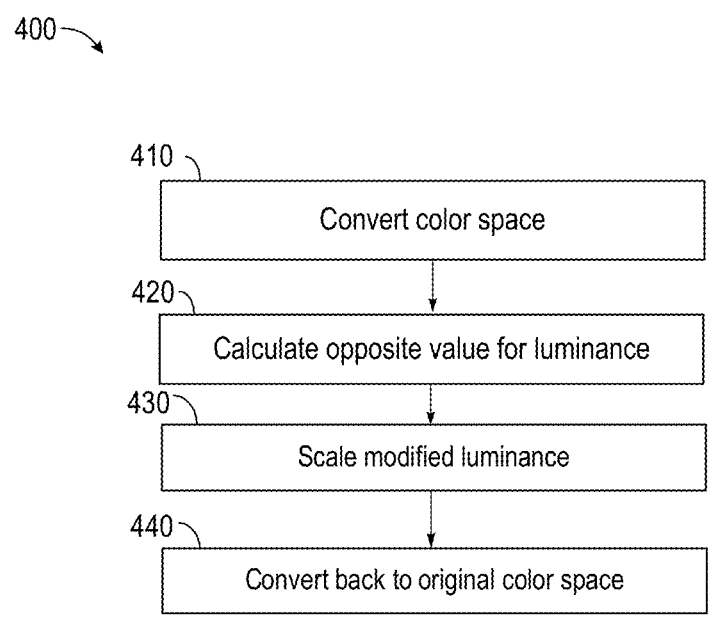
FIG. 4 is flow diagram for a method for adjusting a characteristic of an object in content received for display on a GUI.

FIG. 4 illustrates a process for adjusting a characteristic of one object among the one or more objects existing in contents received for displaying on a GUI. Method 400 begins by converting the color space of the characteristic from an original color space to a more convenient color space, at 410. For example, the color space may be converted from the commonly used RGB color space (or any equivalent linear color space) to the CIELUV color space (or any equivalent non-linear color space such as CIELAB, CIE XYZ, or XYZ), which is parabolic and includes a parameter for luminance. In instances, when the original color space is a non-linear color space, no conversion may be performed. Once the color space has been converted, method 400 proceeds to calculate an opposite value for the luminance property of the converted color, at 420. This may be done by taking the value of the luminance of the converted color (Ly), which may be in the range of 0 and 255 and finding its opposite value Ly' by using formula 2, as shown below.

$$Ly'=255-Ly \quad (2)$$

Method 400 then proceeds to step 430 to scale the modified luminance value Cy' to compensate for the reference background color being the darkest color, such that colors between pure black and the reference background color are not rendered. For example, if the reference background color has a luminance value of 10 (as opposed to 0 for pure black), then the modified formula can be of the form Cy'=(255−Cy)*(245/255)+10, to make a simple scaling of luminance values while ensuring that conversion does not result in luminance values darker than the reference background color. Once the modified luminance value is scaled, the color space is converted back to the original color space (e.g., RGB), at 440. In this manner, the color characteristic is adjusted to have an opposing brightness (luminance) value than its original brightness. As a result, the color is converted to a color that becomes visible in the new viewing mode.

Figure 5:
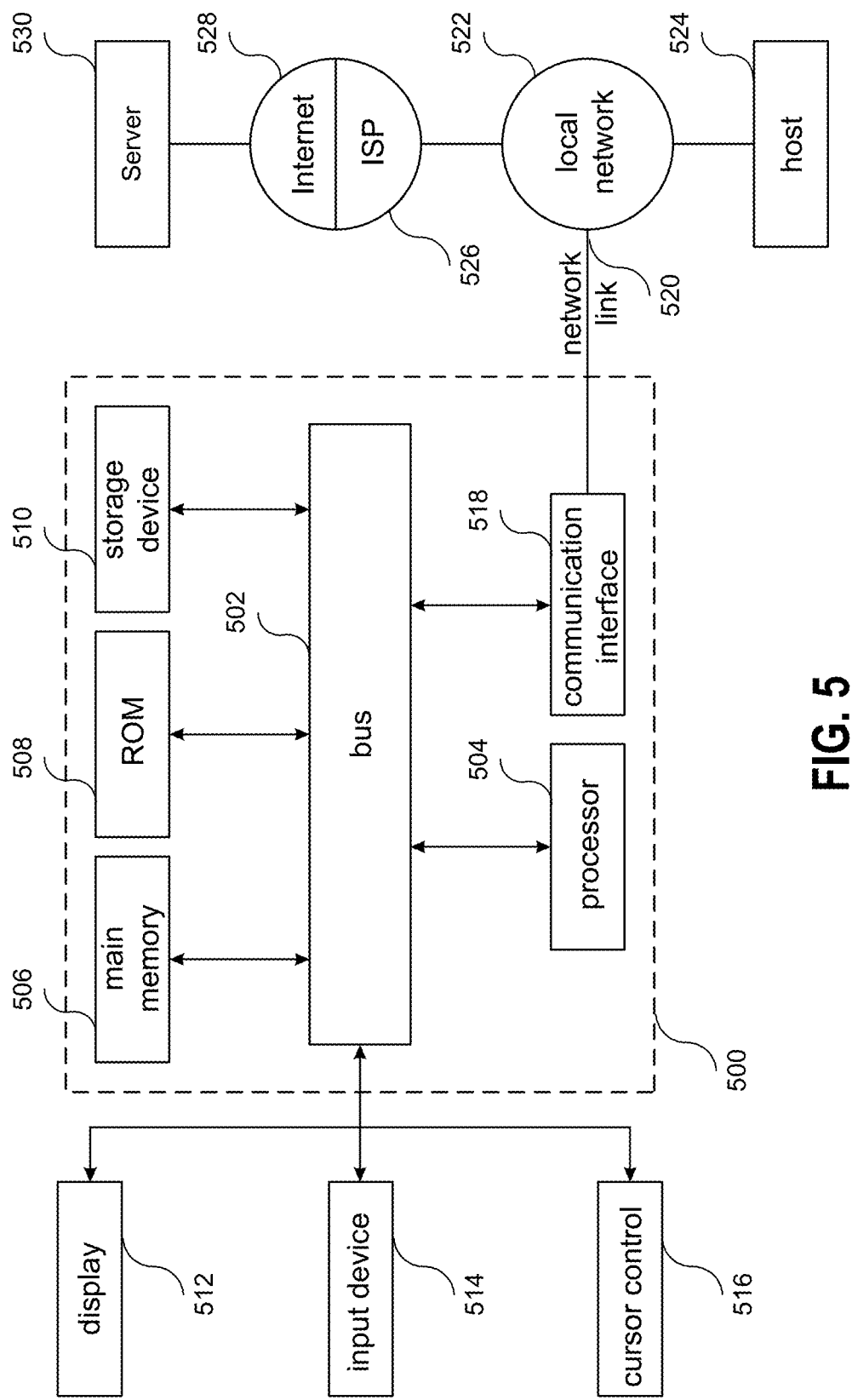
FIG. 5 is a block diagram of an exemplary computer system upon which aspects of this disclosure may be implemented.

FIG. 5 is a block diagram showing an example computer system 500 upon which aspects of this disclosure may be implemented. Computer system 500 includes a bus 502 or other communication mechanism for communicating information, and a processor 504 coupled with bus 502 for processing information. Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. The computer system 500 can implement, for example, one or more steps of the method 300 for improving visibility of contents displayed on a GUI screen while perservering user-generated formatting and/or style of the content, and one or more steps of the method 400 for adjusting a characteristic of an object in content received for display on a GUI.

Computer system 500 can further include a read only memory (ROM) 508 or other static storage device coupled to bus 502 for storing static information and instructions for processor 504. A storage device 510, such as a flash or other non-volatile memory, can be coupled to bus 502 for storing information and instructions.

Computer system 500 may be coupled via bus 502 to a display 512, such as a liquid crystal display (LCD), for displaying information. One or more user input devices, such as the exemplary user input device 514 can be coupled to bus 502, and can be configured for receiving various user inputs, such as user command selections and communicating these to processor 504, or to a main memory 506. The user input device 514 can include physical structure, or virtual implementation, or both, providing user input modes or options, for controlling, for example, a cursor, visible to a user through display 512 or through other techniques, and such modes or operations can include, for example virtual mouse, trackball, or cursor direction keys.

The computer system 500 can include respective resources of processor 504 executing, in an overlapping or interleaved manner, respective program instructions. Instructions may be read into main memory 506 from another machine-readable medium, such as storage device 510. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media can include, for example, optical or magnetic disks, such as storage device 510. Transmission media can include optical paths, or electrical or acoustic signal propagation paths, and can include acoustic or light waves, such as those generated during radio-wave and infra-red data communications, that are capable of carrying instructions detectable by a physical mechanism for input to a machine.

Computer system 500 can also include a communication interface 518 coupled to bus 502, for two-way data communication coupling to a network link 520 connected to a local network 522. Network link 520 can provide data communication through one or more networks to other data devices. For example, network link 520 may provide a connection through local network 522 to a host computer 524 or to data equipment operated by an Internet Service Provider (ISP) 526 to access through the Internet 528 a server 530, for example, to obtain code for an application program.

Devices and methods for improving visibility for contents displayed on a GUI screen while persevering user-generated formatting the contents are described. Devices can include a device including a display, one or more processors, and a memory in communication with the one or more processors, the memory comprising executable instructions that, when executed by, the one or more processors, cause the device to perform functions of receiving content for displaying on the display, parsing the received content into one or more objects, based on at least one formatting characteristic of the one or more objects, comparing for at least one of the one or more objects a first characteristic of the at least one of the one or more object with a second characteristic to determine if a contrast between the first characteristic and the second characteristic satisfies a threshold requirement, upon determining that the threshold requirement is not satisfied, adjusting the first characteristic, and displaying the at least one of the one or more objects with the adjusted first characteristic on the display.

In one implementation, the executable instructions stored on the memory of the device, when executed by the one or more processors may further cause the device to perform functions of determining if a background color of the at least one of the one or more objects is different from a base background color of the content received, upon determining that the background color of the one of the one or more objects is different from the base background color of the content received, comparing the background color of the one of the one or more objects to the adjusted first characteristic to determine if a contrast between the background color of the at least one of the one or more objects and the adjusted first characteristic is below the threshold, and upon determining that the contrast is between the background color of the at least one of the one or more objects and the adjusted first characteristic below the threshold, adjusting the background color of the at least one of the one or more objects.

In one implementation, discloses devices may include a device including a display means, one or more processor means, and memory means in communication with the one or more processors, the memory comprising executable instructions that, when executed by, the one or more processors, cause the device to perform functions of receiving content for displaying on the display, parsing the received content into one or more objects, based on at least one formatting characteristic of the one or more objects, comparing for at least one of the one or more objects a first characteristic of the at least one of the one or more object with a second characteristic to determine if a contrast between the first characteristic and the second characteristic satisfies a threshold requirement, upon determining that the threshold requirement is not satisfied, adjusting the first characteristic, and displaying the at least one of the one or more objects with the adjusted first characteristic on the display means.

In one implementation, the executable instructions stored on the memory means of the device, when executed by the one or more processor means may further cause the device to perform functions of determining if a background color of the at least one of the one or more objects is different from a base background color of the content received, upon determining that the background color of the one of the one or more objects is different from the base background color of the content received, comparing the background color of the one of the one or more objects to the adjusted first characteristic to determine if a contrast between the background color of the at least one of the one or more objects and the adjusted first characteristic is below the threshold, and upon determining that the contrast is between the background color of the at least one of the one or more objects and the adjusted first characteristic below the threshold, adjusting the background color of the at least one of the one or more objects.

In one implementation, methods may include a method for improving visibility of content while preserving original content formatting including receiving content for displaying on a display, parsing the received content into one or more objects, comparing for at least one of the one or more objects a first characteristic of the at least one of the one or more objects with a reference characteristic to determine if a contrast between the first characteristic and the reference characteristic satisfies a first threshold requirement, upon determining that the first threshold requirement is not satisfied, adjusting the first characteristic, comparing for the at least one of the one or more objects a second characteristic of the at least one of the one or more objects with the adjusted first characteristic to determine if a contrast between the adjusted first characteristic and the second characteristic satisfies a second threshold requirement, upon determining that the second threshold requirement is not satisfied, adjusting the second characteristic, displaying the at least one of the one or more objects with the adjusted first characteristic and the adjusted second characteristic on the display.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-4) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are platform-independent, meaning that the techniques may be implemented on a variety of computing platforms having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A device comprising:
   one or more processors; and
   a memory in communication with the one or more processors, the memory comprising executable instructions that, when executed by the one or more processors, cause the device to perform functions of:
   receiving content for displaying on a display screen;
   parsing the received content into one or more objects, based on at least a formatting characteristic of the one or more objects;
   comparing, for at least one of the one or more objects, a first characteristic of the at least one of the one or more objects with a second characteristic to determine if a contrast between the first characteristic and the second characteristic satisfies a contrast ratio threshold requirement;
   upon determining that the contrast ratio threshold requirement is not satisfied, adjusting the first characteristic;
   providing the at least one of the one or more objects with the adjusted first characteristic for being displayed on the display screen; and
   providing a plurality of options on a graphical user interface to be displayed on the display screen for toggling display of the content between an original received content version and a second content version displayed having adjusted color characteristics, each of the plurality of options toggling the display of content between the original received content version and the second content version on one of a plurality of regions of the graphical user interface,
   wherein the contrast ratio threshold requirement is variable for different text sizes.

2. The device of claim 1, wherein the executable instructions, when executed by the one or more processors, further cause the device to perform a function of determining a desired color as a background color for being displayed with the received content.

3. The device of claim 2, wherein the first characteristic is a color of a text in the at least one of the one or more objects, and the second characteristic is the desired background color.

4. The device of claim 1, wherein the executable instructions, when executed by the one or more processors, further cause the device to perform functions of:
   determining if a background color of the at least one of the one or more objects is different from a default background color of the content received;

upon determining that the background color of the one of the one or more objects is different from the default background color of the content received, comparing the background color of the one of the one or more objects to the adjusted first characteristic to determine if a contrast between the background color of the at least one of the one or more objects satisfies the contrast ratio threshold requirement; and upon determining that the contrast between the background color of the at least one of the one or more objects and the adjusted first characteristic does not satisfy the contrast ratio threshold requirement, adjusting the background color of the at least one of the one or more objects.

5. The device of claim 1, wherein each of the plurality of options is a toggle user interface element.

6. The device of claim 1, wherein the second version is a dark viewing mode version.

7. The device of claim 6, wherein the first characteristic is a text color of the object.

8. The device of claim 1, wherein the executable instructions, when executed by the one or more processors, further cause the data processing system to perform functions of:
converting the first characteristic from an original color space to a CIELUV color space;
determining a modified value for a luminance of the CIELUV color space by calculating an opposite value for the luminance;
scaling the modified value for the luminance by a factor to compensate for a desired base color; and
converting the first characteristic back to the original color space.

9. The device of claim 1, wherein the contrast ratio threshold is a visibility threshold.

10. The device of claim 1, wherein the formatting includes a color characteristic of the one or more objects.

11. The device of claim 1, wherein the executable instructions, when executed by the one or more processors, further cause the device to enable a user to set the contrast ratio threshold.

12. A method for improving visibility of content displayed in a graphical user interface while preserving original content formatting comprising:
receiving content for displaying on the graphical user interface;
parsing the received content into one or more objects;
comparing, for at least one of the one or more objects, a first characteristic of the at least one of the one or more objects with a reference characteristic to determine if a contrast between the first characteristic and the reference characteristic satisfies a first contrast ratio threshold requirement;
upon determining that the first contrast ratio threshold requirement is not satisfied, adjusting the first characteristic;
comparing, for the at least one of the one or more objects, a second characteristic of the at least one of the one or more objects with the adjusted first characteristic to determine if the contrast between the adjusted first characteristic and the second characteristic satisfies a second contrast ratio threshold requirement;
upon determining that the second contrast ratio threshold requirement is not satisfied, adjusting the second characteristic;

providing the at least one of the one or more objects with the adjusted first characteristic and the adjusted second characteristic for being displayed on the graphical user interface; and
providing a plurality of options on a graphical user interface to be displayed on the display screen for toggling display of the content between an original received content version and a second content version displayed having adjusted color characteristics, each of the plurality of options toggling the display of content between the original received content version and the second content version on one of a plurality of regions of the graphical user interface;
wherein at least one of the first contrast ratio threshold requirement or the second contrast ratio requirement is variable for different text sizes.

13. The method of claim 12, wherein adjusting the first characteristic comprises:
converting a color space of the first characteristic from an original color space to a modified color space, the modified color space including a value for luminance;
calculating a modified value for the luminance, the modified value being an opposing value of the luminance;
scaling the modified value for the luminance; and
converting the modified color space back to the original color space.

14. The method of claim 12, wherein the first characteristic is a color of text, and the reference characteristic is a base background color.

15. The method of claim 14, further comprising defining the base background color.

16. The method of claim 12, wherein the first contrast ratio threshold requirement is a visibility threshold.

17. A non-transitory computer readable medium on which are stored instructions that, when executed, cause a programmable device to:
receive content for displaying on a display screen;
parse the received content into one or more objects, based on a formatting of the one or more objects;
compare for at least one of the one or more objects a first characteristic of the at least one of the one or more objects with a second characteristic to determine if a contrast between the first characteristic and the second characteristic satisfies a contrast ratio threshold requirement;
upon determining that the contrast ratio threshold requirement is satisfied, adjust the first characteristic;
provide the at least one of the one or more objects with the adjusted first characteristic for being displayed on the display screen; and
provide a plurality of options on a graphical user interface to be displayed on the display screen for toggling display of the content between an original received content version and a second content version displayed having adjusted color characteristics, each of the plurality of options toggling the display of content between the original received content version and the second content version on one of a plurality of regions of the graphical user interface,
wherein the contrast ratio threshold requirement is variable for different text sizes.

18. The non-transitory computer readable medium of claim 17, wherein the instructions, when executed, further cause the programmable device to:
determine if a background color of the at least one of the one or more objects is different from a default background color of the content received;

upon determining that the background color of the one of the one or more objects is different from the default background color of the content received, compare the background color of the one of the one or more objects to the adjusted first characteristic to determine if a contrast between the background color of the at least one of the one or more objects and the adjusted first characteristic satisfies the contrast ratio threshold; and upon determining that the contrast between the background color of the at least one of the one or more objects and the adjusted first characteristic satisfies the contrast ratio threshold, adjust the background color of the at least one of the one or more objects.

19. The non-transitory computer readable medium of claim 17, wherein the first characteristic is a text color of the object.

20. The non-transitory computer readable medium of claim 17, wherein the instructions, when executed, further cause the programmable device to:

convert the first characteristic from an original color space to a CIELUV color space;

determine a modified value for a luminance of the CIELUV color space by calculating an opposite value for the luminance;

scale the modified value for the luminance by a factor to compensate for a desired base background color; and convert the first characteristic back to the original color space.

\* \* \* \* \*